United States Patent Office 3,775,438
Patented Nov. 27, 1973

3,775,438
EPOXIDATION OF HEXAFLUOROPROPYLENE
Robert John Cavanaugh, Wilmington, Del., assignor to E. I. du Pont de Nemours and Company, Wilmington, Del.
No Drawing. Filed May 31, 1972, Ser. No. 258,360
Int. Cl. C07d 1/06
U.S. Cl. 260—348.5 R     8 Claims

ABSTRACT OF THE DISCLOSURE

A process for the epoxidation of hexafluoropropylene which comprises (a) activating a composition consisting essentially of silica by contacting it with a mixture of oxygen and hexafluoropropylene and/or hexafluoropropylene epoxide at from 175 to 400° C. and (b) contacting the activated composition with hexafluoropropylene and oxygen at from 140 to 280° C.

---

This invention relates to the epoxidation of hexafluoropropylene. In particular, this invention relates to accomplishing the aforesaid epoxidation through the use of a silica composition and oxygen.

The epoxide of hexafluoropropylene is known. Examples of processes for its preparation are reaction with oxygen in the presence of a silver catalyst, the use of a medium of alkaline hydrogen peroxide and a technique involving contacting the fluorinated olefin with oxygen at superatmospheric pressure and elevated temperatures in an inert fluid diluent. An improved process was sought.

Such a process has been found. It is a process for the epoxidation of hexafluoropropylene which comprises (a) activating a composition consisting essentially of silica by contacting it with a member selected from the group consisting of a mixture of oxygen and hexafluoropropylene, hexafluoropropylene epoxide, and mixtures thereof, at from 175 to 400° C., preferably from 200 to 280° C. and (b) contacting the activated composition with hexafluoropropylene and oxygen at from 140 to 280° C., preferably from 190 to 225° C.

The composition consisting essentially of silica is normally at least 60 percent by weight silica, preferably at least 95 percent by weight silica. "Consisting essentially of" as used throughout the specification and claims does not exclude unspecified materials which do not prevent the advantages of the invention from being realized. Examples of useful compositions are silica gel, soft glass (approximately 72 percent by weight $SiO_2$, 15 percent by weight $Na_2O$, 9 percent by weight CaO, 3 percent by weight MgO, and 1 percent by weight $Al_2O_3$), Pyrex® Brand glass (Corning Glass Works, Corning, N.Y.) (approximately 80 percent by weight $SiO_2$, 14 percent by weight $B_2O_3$, 4 percent by weight $Na_2O$, and 2 percent by weight $Al_2O_3$), Vycor® Brand glass (Corning Glass Works) (approximately 96 percent by weight $SiO_2$, 3 percent by weight $B_2O_3$ and 1 percent by weight other oxides), Pyroceram® Brand Ceramic (Corning Glass Works), lithium alumino-silicate glass, macroporous silica beads Gordler silica carrier T-869 (Chemetron Corp., Girdler Div., Louisville, Ky.), and sand. Normally for better results the glasses are ground to at least a macropowder (10–30 mesh) before using in the process of this invention. However, this is not required. The silica beads, for example, cause the production of hexafluoropropylene epoxide without grinding. Silica gel is the preferred composition. Silica gel is normally at least 98 percent by weight silica and preferably has a surface area of at lest 80 meter²/gram. Silica gels with surface areas of at least 200 meter²/gram are most preferred.

The composition is normally activated by contacting it with oxygen and hexafluoropropylene and/or hexafluoropropylene epoxide at from 175 to 400° C., preferably from 200 to 280° C. Activation is defined as improving the composition's capability of catalyzing the conversion of hexafluoropropylene and oxygen to hexafluoropropylene epoxide. The activation temperature and times are dependent on one another, the type of composition utilized and type of atmosphere used for activation. If there is a high temperature, the time to activate the composition is less whereas if the temperature is low, the time required for activation is longer. The time required for activation is normally from ½ to 25 hours. With the preferred activation temperatures, the time required for activation is normally from 2 to 5 hours.

Some compositions are easily activated in an oxygen and hexafluoropropylene atmosphere while others are more readily activated in an atmosphere which also contains some hexafluoropropylene epoxide or which is substantially all hexafluoropropylene epoxide. The use of an atmosphere which contains some or all hexafluoropropylene epoxide is sometimes preceded or followed by the use of a mixture of hexafluoropropylene and oxygen. The oxygen can be in the form of air or other gas mixtures normally containing at least 20 percent by volume oxygen with the remainder being gas which is inert to the reaction such as helium or carbon dioxide. A gas which is substantially all oxygen is preferred.

The process of this invention can be batch or continuous, the latter being preferred. In a continuous operation the hexafluoropropylene and oxygen are passed over a bed of the composition which can be in a fixed or fluidized form. In the fluidized bed, there is normally continual addition and removal of the composition from the bed. Thus, continued activation of new composition is taking place followed by the epoxidation of the hexafluoropropylene over the composition after such activation. Alternatively, the composition can be activated (step (a)) prior to its addition to the bed.

The molar ratio of the hexafluoropropylene to oxygen as fed to the reactor in which the epoxidation is to take place is normally from 1:5 to 15:1, preferably from 2:1 to 8:1 in both steps (a) and (b) of the process of this invention. The statements above relating to step (a) concerning the forms of the oxygen also apply to step (b).

In the process of the present invention, yields of up to about 80 percent and above can be obtained employing some of the compositions. The conversions normally are about 10 to 40 percent. Conversion as used throughout is defined as the percentage amount of the hexafluoropropylene converted to compounds other than hexafluoropropylene specifically, to $CO_2$, $CO_2$ $CF_3COF$, and HFPO. The percentage yield of hexafluoropropylene epoxide is 100 times the moles of hexafluoropropylene converted to hexafluoropropylene epoxide divided by the moles of hexafluoropropylene consumed. The percentage yields of the other compounds are calculated similarly.

The pressure at which the process of this invention is operated depends on the temperature involved. Atmospheric pressure is normally utilized; superatmospheric pressure, normally not above about 3 atmospheres, can be utilized but these higher pressures are generally used when the lower temperatures are being maintained. Some compositions produce lower conversions at the lower temperatures, and require higher temperatures or the use of pressure for the preferred yields and conversions. Superatmospheric pressure can be used in both step (a) and step (b), for instance, when a continuous process is utilized, but can be limited to only step (b).

The process of this invention generally produces hexafluoropropylene epoxide in good yields and conversions for 10–80 hours. However, after this period, significant amounts of hexafluoroacetone are produced rather than the hexafluoropropylene epoxide. It has been found that this can be prevented by having present from 0.5 to 3 mole percent water, based upon total reactants, i.e., hexafluoropropylene and oxygen. Addition of water increases composition life significantly. Normally, the addition of water is used in step (b) but it can also be used in step (a). If the technique of adding water is not utilized, the aged composition can be regenerated by passing steam over it followed by step (a) of the process of this invention.

The hexafluoropropylene epoxide can be separated from the outlet stream of the reactor in the process of this invention by scrubbing and extractive distillation.

Hexafluoropropylene epoxide is useful as an intermediate for preparing other intermediates such as perfluorovinyl ethers or high temperature resistant fluids. The ethers are useful in the preparation of ion exchange membranes, mechanical polymers, and elastomers.

The following examples are meant to illustrate but not to limit the invention. All percentages are molar unless otherwise specified. In the examples HEP is hexafluoropropylene; HFPO is hexafluoropropylene epoxide; and PAF is perfluoroacetyl fluoride.

EXAMPLE I

A 6′, 3/8″ outside diameter stainless steel tube in the form of a coil was charged with 90 ml. of Davison silica gel, Grade 02 (Davison Div., W. R. Grace, Inc., Baltimore, Md.). The coil was placed in a silicone oil bath heated to 200° C. at 10:00 and the stream of 20 ml./min. of hexafluoropropylene and 10 ml./min. of oxygen was introduced into the tube. Table 1 below indicates the data obtained for the rest of the run. Analysis was by gas chromatography.

TABLE 1

| Time | Bed temp., °C. | Flow rates, ml./min. HFP | O$_2$ | Conversion, percent HFP | Percent yield HFPO | CO$_2$ | COF$_2$ | PAF |
| --- | --- | --- | --- | --- | --- | --- | --- | --- |
| 11:35 | 201 | 20 | 10 | 5 | 67 | 0 | 33 | 0 |
| 14:30 | 202 | 20 | 10 | 7 | 79 | 0 | 21 | 0 |
| | | Heated as is overnight | | | | | | |
| 08:35 | 203 | 20 | 10 | 45 | 73 | 4 | 5 | 17 |

EXAMPLE II

Ninety ml. of Davison silica gel, Grade 45, was charged to a 6′, 3/8″ outside diameter stainless steel tube in the form of a coil. The coil was immersed in a silicone oil bath. The coil was heated for 2¼ hours at 240° C. under a stream of 20 ml./min. hexafluoropropylene and 10 ml./min. oxygen. Table 2 depicts the data from the rest of the run. Analysis was by gas chromatography.

TABLE 2

| Time | Bed temp., °C. | Flow rates, ml./min. HFP | O$_2$ | Conversion, percent HFP | Percent yield HFPO | CO$_2$ | COF$_2$ | PAF |
| --- | --- | --- | --- | --- | --- | --- | --- | --- |
| 13:15 | 235 | 20 | 10 | 28 | 28 | 72 | 0 | 0 |
| 14:00 | 235 | 20 | 10 | 19 | 40 | 60 | 0 | 0 |
| 15:10 | 238 | 20 | 10 | 18 | 40 | 60 | 0 | 0 |
| 15:45 | 245 | 20 | 10 | 20 | 45 | 55 | 0 | 0 |

EXAMPLE III

A 1′ long, 1¼″ outside diameter quartz tube was charged with 90 ml. of Pyrex® Brandglass (Corning Glass Works, Corning, N.Y.) ground to pass a 40 mesh sieve. The tube was placed in a tube furnace and heated overnight under a stream of 20 ml./min. helium at 200° C. The temperature was recorded by means of a thermocouple placed in a well in the center of the catalyst bed. The helium was turned off and a stream of 20 ml./min. hexafluoropropylene and 10 ml./min. oxygen was turned on. Table 3 below indicates the data from the run. The reactor exit stream was analyzed by gas chromatography. The conversion in this example was calculated by measuring the difference in the hexafluoropropylene peak height in the feed and exit streams for a given sample size. The yield of hexafluoropropylene epoxide was calculated on the basis of peak height corrected for the difference in thermoconductivity.

TABLE 3

| Time | Bed temp., °C. | Flow rates, ml./min. HFP | O$_2$ | Conversion, percent HFP | Percent yield HFPO | CO$_2$ |
| --- | --- | --- | --- | --- | --- | --- |
| 08:20 | 200 | 20 | 10 | | | |
| 08:35 | 200 | 20 | 10 | 0 | 0 | 0 |
| 09:00 | 200 | 20 | 10 | 0 | 0 | 0 |
| 09:30 | 250 | 20 | 10 | | | |
| 09:45 | 250 | 20 | 10 | | | |
| 10:00 | 250 | 20 | 10 | 55 | 0 | 23 |
| 10:30 | 200 | 20 | 10 | | | |
| 10:45 | 200 | 20 | 10 | 55 | 8 | 25 |
| 11:15 | 200 | 20 | .10 | 54 | 7 | 25 |
| 11:25 | 175 | 20 | 10 | | | |
| 11:35 | 175 | 20 | 10 | 54 | 21 | 25 |
| 11:50 | 175 | 20 | 10 | 57 | 11 | 23 |
| 12:05 | 150 | 20 | 10 | | | |
| 12:20 | 150 | 20 | 10 | 52 | 37 | 25 |
| 12:30 | 150 | 20 | 10 | 55 | 34 | 23 |

EXAMPLE IV

Ninety cc. of Pyroceram® lithium alumino-silicate glass (Corning Glass Works, Corning, N.Y.), 10–20 mesh, was charged to a 6′ long, 3/8″ outside diameter, stainless steel coil immersed in a silicone oil bath. The composition bed was heated at 200° C. for 75 minutes under a stream of 20 ml./min. hexafluoropropylene and 10 ml./min. oxygen. The temperature was then increased to 240° C. and fluctuated from that to 301° C. for approximately 4 hours. There was substantially no conversion of HFP. At that time the stream of hexafluoropropylene and oxygen was replaced by a stream of hexafluoropropylene epoxide. The temperature was held at approximately 250° C. for 30 minutes while the bed was held under a stream of hexafluoropropylene epoxide (20 ml./min.). At the end of the 30 minutes the hexafluoropropylene epoxide stream was replaced by a stream of 20 ml./min. hexafluoropropylene and 10 ml./min. oxygen. The temperature was lowered to 220° C. After 15 minutes the analysis of a sample from the exit stream of the coil indicated that the hexafluoropropylene conversion was 66.1 percent, the hexafluoropropylene epoxide yield was 24.2 percent, the yield of carbon dioxide was 6.2 percent, the yield of carbonyl fluoride was 30.3 percent, the perfluoroacetyl fluoride yield was 39.3 percent, and there was a trace of hexafluoroacetone. Analysis was by gas chromatography.

EXAMPLE V

Approximately ninety ml. of silica sand (granular) (Fisher Scientific Company, Pittsburgh, Pa.) were charged to a 6′ long, 3/8″ outside diameter stainless steel coil in a silicone oil bath. The bed was contacted with a stream of hexafluoropropylene (20 cc./min.)

and oxygen (10 cc./min.) for 2½ hours at 240° C., there was no conversion of HFP. Prior to such the silica bed had been heated overnight at 240° C. helium. The silica bed was then treated for 50 minutes at from 240 to 223° C. under a stream of hexafluoropropylene (110 cc./min.), hexafluoropropylene epoxide (10 cc./min.) and oxygen (10 cc./min.). The data from the remainder of the run is shown in Table 4. Analysis was by gas chromatography.

TABLE 4

| Temp., °C. | Contact time (min.) | Flow rate, ml./min. | | Conversion, percent HFP | Percent yield | | | |
|---|---|---|---|---|---|---|---|---|
| | | HFP | $O_2$ | | HFPO | $CO_2$ | $COF_2$ | PAF |
| 222 | 3 | 20 | 10 | 37 | Trace | 8 | 42 | 49 |
| 222 | 3 | 20 | 10 | 39 | Trace | 6 | 42 | 51 |
| 204 | 3 | 20 | 10 | 0 | Trace | | | |
| Silica bed treated 1 hr. at 240° C. with HFPO (30 cc./min.) | | | | | | | | |
| Silica bed treated 15 min. at 240° C. with HFP/$O_2$/HFPO (10/10/10 cc./min.) | | | | | | | | |
| 242 | 3 | 20 | 10 | 41 | | 4 | 36 | 59 |
| 242 | 3 | 20 | 10 | 41 | | 4 | 35 | 60 |
| 245 | 3 | 20 | 10 | 36 | | 7 | 34 | 58 |
| 242 | 3 | 20 | 10 | 45 | | 5 | 40 | 55 |
| 260 | 3 | 20 | 10 | 48 | | 5 | 36 | 60 |
| 263 | 3 | 20 | 10 | 47 | | 4 | 33 | 62 |
| 223 | 3 | 20 | 10 | 46 | 1 | 4 | 36 | 48 |
| 233 | 3 | 20 | 10 | 39 | 3 | Trace | 25 | 71 |
| 219 | 3 | 20 | 10 | 41 | 10 | | 37 | 52 |
| 215 | 3 | 20 | 10 | 43 | 17 | | 34 | 49 |
| 207 | 3 | 20 | 10 | 41 | 27 | | 24 | 48 |
| 203 | 3 | 20 | 10 | 42 | 38 | | 17 | 44 |
| 200 | 3 | 20 | 10 | 43 | 42 | | 15 | 42 |

EXAMPLE VI

A 6′ long, ⅜″ outside diameter stainless steel tube in the form of a coil was charged with 90 ml., 10–20 mesh, Davison silica gel, Grade 02. The tube was heated at 240° C. for 3½ hours, under a stream of 10 ml./min. oxygen and 20 ml./min. hexafluoropropylene. The data from the remainder of the run is shown in Table 5. Water was added to the feed stream at time 11:25 in the run by bubbling the feed stream through a medium porosity bubbling stone prior to introduction into the reactor. The water addition was stopped at time 13:31. Analysis was by gas chromatography and infrared spectroscopy indicated that there was hexafluoroacetone persent in the exit gas at time 14:10.

EXAMPLE VII

A 6′, ⅜″ outside diameter stainless steel tube was charged with 90 cc. of Davison silica gel, Grade 02. The tube was placed in a silicone oil bath maintained at 260° C. and a stream of 20 ml./min. hexafluoropropylene and 10 ml./min. oxygen was passed through the tube. After 25 minutes, gas chromatographic analysis of the reactor exit stream showed 13 percent of the hexafluoropropylene was converted exclusively to carbonyl fluoride. After an additional 1¾ hrs. at 260° C., the conversion rose to 38 percent and the products were carbonyl fluoride (38 percent) and perfluoroacetyl fluoride (62 percent). The bath temperature was then lowered to 221° and the feed stream was passed through a medium porosity bubbling stone immersed in water. The conversion was then 53 percent and the yield of hexafluoropropylene epoxide was 35 percent. The reactor was then heated overnight at 210° under the same conditions. After the reactor had been running continuously for 50½ hours, the feed stream was replaced by a stream which consisted of 34.3 percent oxygen, 54.9 percent hexafluoropropylene, 10.4 percent hexafluoropropylene epoxide and 0.4 percent perfluoromethyl cyclopropane. The feed rate was 30 ml./min. and it was

TABLE 5

| Time | Bed temp., °C. | Flow rates, ml./min. | | Conversion, percent HFP | Percent yield | | | |
|---|---|---|---|---|---|---|---|---|
| | | HFP | $O_2$ | | HFPO | $CO_2$ | $COF_2$ | PAF |
| 14:50 | 239 | 20 | 10 | 47 | 2 | 9 | 26 | 63 |
| 15:35 | 200 | 20 | 10 | 42 | 17 | 27 | 10 | 45 |
| 15:45 | 200 | 20 | 10 | 42 | 14 | 29 | 10 | 47 |
| 16:10 | 190 | 20 | 10 | 42 | 28 | 25 | 8 | 38 |
| 16:30 | 174 | 20 | 10 | 19 | 48 | 9 | 6 | 27 |
| 09:25 | 172 | 20 | 10 | ~0 | Trace | 0 | 0 | 0 |
| 10:30 | 190 | 20 | 10 | 29 | 24 | 27 | 9 | 40 |
| 11:25 | 198 | 20 | 10 | 17 | 79 | 2 | 12 | 7 |
| 11:50 | 200 | 20 | 10 | 16 | 80 | 2 | 12 | 7 |
| 13:05 | 210 | 20 | 10 | 58 | 59 | 5 | 12 | 23 |
| 13:30 | 222 | 20 | 10 | 55 | 31 | 8 | 16 | 45 |
| 13:31 | Temp. lowered $H_2O$ off | | | | | | | |
| 14:10 | 268 | 20 | 10 | 39 | 9 | 26 | 12 | 53 |

TABLE 6

| Time (hr.) from switch to HFP/$O_2$ | Temp., °C. | Flow rates, ml./min. | | Pressure, p.s.i.g. | Conversion, percent HFP | Percent yield | | | | $H_2O$ added |
|---|---|---|---|---|---|---|---|---|---|---|
| | | HFP | $O_2$ | | | HFPO | $CO_2$ | $COF_2$ | PAF | |
| 0.5 | 260 | 20 | 10 | 0 | 13 | 0 | 0 | 100 | 0 | No. |
| 2.25 | 260 | 20 | 10 | 0 | 30 | 0 | 0 | 38 | 62 | No. |
| 3 | 221 | 20 | 10 | 0 | 53 | 35 | 18 | 2 | 45 | Yes. |
| 19 | 210 | 20 | 10 | 0 | 34 | 60 | 10 | 8 | 22 | Yes. |
| 20 | 203 | 20 | 10 | 0 | 22 | 75 | 9 | 5 | 11 | Yes. |
| 44 | 207 | 20 | 10 | 0 | 26 | 76 | 7 | 4 | 13 | Yes. |
| 96.5 | 179 | ~20 | ~10 | 15 | 11 | 85 | 6 | 2 | 7 | Yes. |
| 97.5 | 185 | ~20 | ~10 | 15 | 15 | 84 | 5 | 2 | 8 | |
| 98 | 192 | ~20 | ~10 | 15 | 30 | 79 | 5 | 3 | 13 | |
| 99.5 | 205 | ~80 | ~40 | 12 | 8 | 82 | 6 | 3 | 10 | |
| 100 | 215 | ~80 | ~40 | 12 | 36 | 17 | 11 | 14 | 59 | |
| At this point, the reactor was placed under helium for the weekend | | | | | | | | | | |
| 101 | 169 | ~12 | ~8 | 31 | 65 | 38 | (1) | (1) | (1) | |
| 102 | 140 | ~12 | ~8 | 31 | 58 | 26 | (1) | (1) | (1) | |

[1] Not measured.

likewise passed through the water saturator. The reactor was operated under these conditions for additional 39½ hours. The feed stream was then switched back to 20 ml./min. hexafluoropropylene and 10 ml./min. oxygen and passed through the bubbling stone immersed in water. A needle valve at the exit of the reactor was then partially closed to allow the reaction to proceed under pressure. The results are shown in Table 6. Analysis was by gas chromatography.

I claim:

1. A process for the epoxidation of hexafluoropropylene which comprises (a) activating a composition consisting essentially of silica by contacting it with a member selected from the group consisting of a mixture of oxygen and hexafluoropropylene, hexafluoropropylene epoxide and mixtures thereof, at from 175 to 400° C. and (b) contacting the activated composition with hexafluoropropylene and oxygen at from 140° to 280° C.

2. The process of claim 1 in which step (a) is carried out for ½ to 25 hours.

3. The process of claim 1 in which step (a) is carried out at from 200° to 280° C.

4. The process of claim 1 in which step (b) is carried out at from 190° to 225° C.

5. The process of claim 1 which is carried out at superatmospheric pressure.

6. The process of claim 1 in which step (b) is carried out in the presence of water, said water being present to the extent of 0.5 to 3 mole percent of the total moles of hexafluoropropylene and oxygen contacted with the activated composition.

7. The process of claim 6 wherein the composition consisting essentially of silica is silica gel.

8. The process of claim 7 in which step (a) is carried out at 200° to 280° C. and step (b) at 190° to 225° C.

References Cited

UNITED STATES PATENTS

| 3,332,965 | 7/1967 | Fukui et al. | 260—348.5 R |
| 3,600,409 | 8/1971 | Milian et al. | 260—348.5 R |

NORMA S. MILESTONE, Primary Examiner

U.S. Cl. X.R.

260—348.5 F